United States Patent [19]
Herschitz et al.

[11] Patent Number: 4,849,600
[45] Date of Patent: Jul. 18, 1989

[54] CONSTANT TEMPERATURE WELDING METHOD

[75] Inventors: Roman Herschitz, Plainsboro; Scott T. Demarest, Lawrenceville Township, Mercer County; Stephen H. Chu, Middletown Township, Monmouth County; John G. Leung, East Windsor, all of N.J.

[73] Assignee: General Electric Company, East Windsor, N.J.

[21] Appl. No.: 234,971

[22] Filed: Aug. 22, 1988

[51] Int. Cl.$^4$ .............................................. B23K 11/24
[52] U.S. Cl. ................................ 219/110; 219/56.21; 219/117.1
[58] Field of Search ................. 219/110, 117.1, 56.21, 219/56.22

[56] References Cited

U.S. PATENT DOCUMENTS

| | | | |
|---|---|---|---|
| 2,253,375 | 8/1941 | Henninger | 219/56.22 |
| 2,817,747 | 12/1957 | Devonshire et al. | 219/110 |
| 3,191,441 | 6/1965 | Erickson | 219/110 |
| 3,440,389 | 4/1969 | Meyer | 219/110 |
| 3,529,121 | 9/1970 | Bobo et al. | 219/110 |
| 3,778,581 | 12/1973 | Denny | 219/110 |
| 3,867,697 | 2/1975 | Vanzetti et al. | 324/158 D |
| 4,079,225 | 3/1978 | Warner | 219/110 |
| 4,168,430 | 9/1979 | Denis et al. | 250/338 |
| 4,214,164 | 7/1980 | Traub et al. | 250/338 |
| 4,224,496 | 9/1980 | Riordan et al. | 219/110 |
| 4,359,622 | 11/1982 | Dostoomian et al. | 219/110 |
| 4,721,947 | 1/1988 | Brown | 324/540 |

OTHER PUBLICATIONS

"Design of a Two-Phase Capillary Pumped Flight Experiment", by Chalmers et al., published by SAE 18th Intersociety Conference on Environmental Systems, Jul. 11-13-1988.

"Atomic Resolution Observations of Solute-Atom Segregation Effects and Phase Transitions in Stacking Faults in Dilute Cobalt Alloys-(I) and (II), Experimental Results", by R. Herschitz et al.

*Primary Examiner*—Clifford C. Shaw
*Attorney, Agent, or Firm*—Clement A. Berard, Jr.; William H. Meise

[57] ABSTRACT

A method for welding two pieces includes juxtaposing the pieces and monitoring the temperature of the region to be welded. Energy is applied at a time rate sufficient to raise the temperature of the region to be welded at a rate exceeding a predetermined value. Once a predetermined temperature is reached, that temperature is held for a predetermined time. The rate of rise of temperature is 70% of the final or predetermined temperature in 20% of the predetermined time. After the weld is made, the rate of fall of the temperature exceeds a predetermined value. Quenching may be used to achieve the desired rate of fall.

10 Claims, 3 Drawing Sheets

CONSTANT TEMPERATURE WELDING METHOD

BACKGROUND OF THE INVENTION

This invention relates to fusion welding at constant temperature with predetermined minimum temperature rise times.

Modern repair and manufacturing fabrication methods often require welding. Unlike other joining methods, welding makes joints which are as strong as, or almost as strong as, the basic materials. Primitive welding methods involved the use of a brazier of coals, an anvil and a hammer. Welds made by use of such equipment might be good or bad, depending upon the skill of the craftsman using them, but would certainly be variable.

The increasing stress upon reliability has led to automated welding arrangements and to sophisticated electrical welders, such as that described in U.S. Pat. No. 4,359,622 issued Nov. 16, 1982 to Dostoomian et al. The Dostoomian arrangement includes a complex controller and different types of temperature sensors for applying electrical power to the work piece to cause the temperature of the work piece in the region being welded to follow the temperature profile of a previously welded piece which tests have shown to have sufficient strength.

It may be desirable for many reasons to have even more reliable welds. For example, automobile manufacturers have economic incentives (such as warranty costs) to produce welds which are highly consistent and therefore have well defined strength characteristics from one weld to the next, and which further have a microstructure which is not conducive to corrosion or to failure due to the propagation of microcracks attributable to stress-related corrosion.

During the formation of a weld, intricate fusion occurs between the materials of the two pieces to be joined. For example, if separate pieces of silver (Ag) and copper (Cu) are to be welded, then Ag atoms diffuse into the Cu, and Cu atoms diffuse into the Ag during the formation of the weld. Statistical theory, described for example in the text "Diffusion In Solids" by P. G. Shewmon, published by McGraw Hill Book Company, New York, 1963 can describe the movement of an atom from its original position in a particular time t at a particular temperature T. The expression is given by:

$$x = (6Dt)^{\frac{1}{2}} \qquad (1)$$

where x is the distance from the original position, D is a diffusion coefficient at a temperature T, and t is time. Diffusion coefficient D, in turn, is given by the relationship:

$$D = D_o \exp(-Q/kT) \qquad (2)$$

where $D_o$ is a pre-exponential diffusion factor, Q is an activation energy of diffusion, T is temperature in degrees Kelvin, and k is Boltzmann's constant (1.99 cal/mole K).

Parameters $D_o$ and Q are parameters which are defined for particular materials. These values have been measured experimentally and the data is available in the published literature, as in for example the "Handbook of Chemistry and Physics", CRC Press, Cleveland, Ohio, 1974. From the equations and constants, it is clear that for a particular time duration of the weld (welding time), an atom moves further from its original position at higher welding temperatures. If the welding temperature is constant, an atom moves further from its original position if it is given a longer time in which to move, i.e., at longer weld durations.

In almost any ordinary welding, atoms of different types are involved. This is true, even if the pieces being joined are nominally of the same material. This is because the materials are never absolutely pure, but ordinarily contain substantial impurities. For example, silver is available in "coin silver" form, which is 90% pure, with the principal portion of the remainder being copper; and with purities such as 99.5% and 99.9% the impurities being carbon, nickel, sulfur, oxygen and chlorine. It is well known that iron often includes carbon and small amounts of many other elements such as chromium, manganese, nickel, silicon, and titanium. During welding of dissimilar materials or even of similar materials, different compounds or different solid phases of the same compound can be formed within the heated region. For convenience, these are all referred to as phases. In general, such solid phases are areas of the solid which have different chemical or microstructural composition than the bulk material. The strength of a welded joint can depend upon the number of inclusions of phases other than the main or desired phase, and also upon the size of the included phases.

There are a number of theories which address the nucleation and growth of new phases. Exact expressions for nucleation and growth rates are complex, and depend upon a number of different variables. The dependence of the nucleation of a new phase in terms of temperature and time can be expressed generally by the equation:

$$I \alpha \exp(-G/kT) \qquad (3)$$

where I is a nucleation rate, G is an activation energy, k is Boltzmann's constant and T is temperature. Equation 3 makes it clear that the nucleation rate of a new phase increases exponentially with an increase in temperature.

Once nuclei of a new phase are formed, during the initial stages, the growth rate at particular temperature is expressed by:

$$Y \alpha (t)^{3/2} \qquad (4)$$

where Y is a growth rate, and t is time. Equation 4 demonstrates that nuclei of a new phase grow, at least during the initial stages, at a rate proportional to $t^{3/2}$. Thus, at longer weld durations, larger size particles are present in the weld zone compared with the particles formed at shorter weld times. The size of the different phases included in the weld zone can strongly affect the characteristics of the weld. Naturally, it is desirable that the weld have virtually no nucleated phases other than the desired phase of the bulk material, or that if such phases occur, that the size of the inclusion be small.

As a particular example, if two pieces of silver, each including 0.5% nickel impurities, are welded, an undesired phase consisting of $Ag_3Ni$ may nucleate and grow in roughly spherical form. The nucleated $Ag_3Ni$ is 25% Ni instead of 0.5%, which depletes the bulk material of Ni. The amount of Ni in the bulk of the weld, therefore, will depend upon the number of nucleation sites, and upon the length of time and rate of growth of the nucleated solid phases. Other phases may have elongated forms or crystalline structure. Depending upon the size and physical characteristics of the interface between the nucleated phase region and the bulk material, the weld region may be more or less brittle, have different strength and may even have different characteristics in various directions (anisotropy). A welding technique is desired which provides improved weld-to-weld consistency.

SUMMARY OF THE INVENTION

A method and apparatus for welding together two pieces includes the steps of monitoring and controlling at least one temperature near the region to be welded and applying energy to the two pieces to be welded with a time rate of application of the energy which is sufficient to raise the temperature of the materials near the region to be welded so that the rate of rise of temperature exceeds a predetermined minimum. When the application of energy causes the temperature to reach a predetermined value, the temperature monitor is used for feedback control of the application of energy in order to maintain the predetermined temperature for a predetermined time. In a particular application, the rate of rise of temperature has a value which is greater than 70% of the predetermined temperature divided by 20% of the predetermined time. According to a further aspect of the invention, the pieces are "quenched" so that the rate of fall of temperature after the end of the predetermined time exceeds a predetermined minimum rate of fall.

DESCRIPTION OF THE INVENTION

Figure 1:
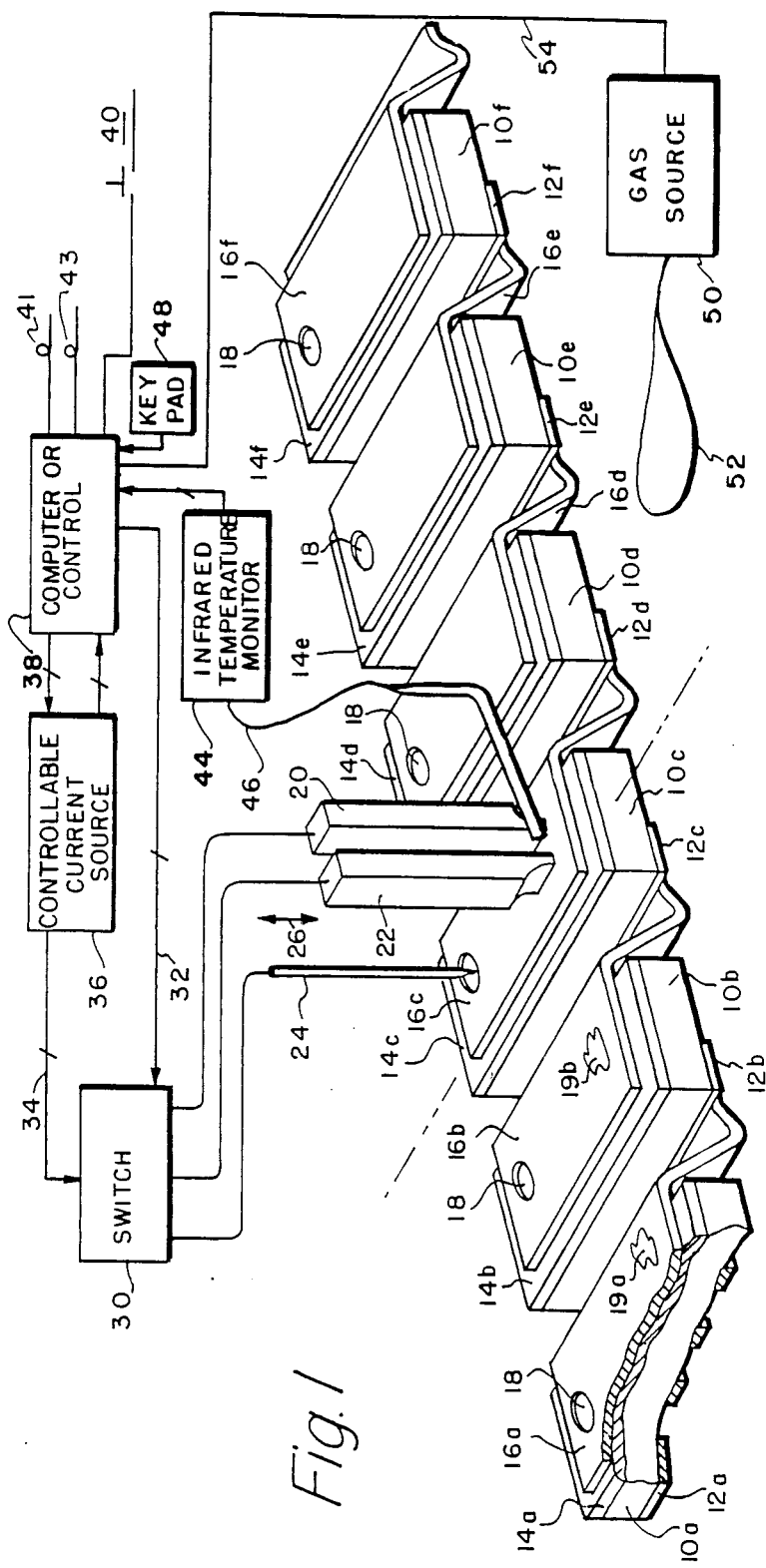
FIG. 1 is a diagram, partially in perspective or isometric view, and partially in block diagram form, of an apparatus according to the invention.

The particular problem to which the invention is directed arose out of the need to improve the reliability of solar array panels intended for use in a low earth orbit in which the panels are subjected to a large number of heating and cooling cycles. Such panels, when made up from solar cells including metallized portions soldered to interconnecting strips, may not have the desired level of reliability due to the solder connections. In FIG. 1, a plurality of individual solar cells 10a, 10b, 10c ... 10f are illustrated as blocks which are spaced apart to more clearly illustrate their separate nature, but which may be contiguous or closely juxtaposed to maximize the amount of surface coverage and to thereby minimize the length of interconnections. Each individual solar cell 10 includes a bottom metallization 12. Thus, solar cell 10a includes a bottom metallization 12a, solar cell 10c includes a bottom metallization 12c, etc. Bottom metallizations 12 of the solar cells are interconnected in the final array by a welding method according to the invention. The bottom metallizations include a relatively wide portion adjacent a long edge and strips extending across the bottom of the solar cell which leave large portions non-metallized for penetration by photons of light.

Each individual solar cell 10 also includes an upper metallization contact 14 which essentially covers the top surface. Thus, solar cell 10a has disposed upon its upper surface a metallization surface 14a, solar cell 10b has a metallization surface 14b, etc.

The upper metallization of each solar cell 10 is connected to the wide portion of the bottom of the metallization 12 of the next adjacent solar cell on one side by means of a conductive connection strip 16. Thus, upper metallization 14b of solar cell 10b is connected by strip 16b to bottom metallization 12c of solar cell 10c, and upper metallization 14c of solar cell 10c is connected by strip 16c to bottom metallization 12d of solar cell 10d. Each conductive strip 16 is welded to each of the associated metallizations of the solar cells to interconnect the contacts to form a series circuit.

As illustrated in FIG. 1, the welding process is accomplished by an apparatus including a first welding electrode 20, and a second welding electrode 22. As described in a copending patent application Ser. No. 223,497 entitled PREWELD TEST METHOD, and filed July 25, 1988 in the name of Herschitz et al., a third auxiliary electrode 24 may be used to improve the reliability of the resulting welds. Welding electrodes 20 and 22 are desirably made from copper for high conductivity and are tipped with molybdenum (Mb), which has a high melting temperature, for low wear. Electrodes 20, 22 and 24 are held in a mutually spaced relationship by a holder (not illustrated) which is capable of up and down motion relative to the upper surfaces of the solar cells, as illustrated by two-headed arrow 26. Electrodes 20, 22 and 24 are electrically isolated from each other when not in contact with a conductive strip 16. Electrodes 20, 22 and 24 are connected by conductors of suitable size to a switch arrangement illustrated as a block 30. Switch arrangement 30 receives control signals over a conductor set 32 and also receives electrical power over a conductor set 34 for applying voltage or current to pairs of electrodes 20, 22 for welding and also to pairs of electrodes including electrode 24, all under the command of a control circuit illustrated as a block 38.

An infrared-sensing temperature monitor apparatus illustrated as a block 44 receives infrared signals from the region to be welded by way of a fiber-optic cable 46, and generates signals representative of the temperature which are applied to control block 38. A keypad 48 provides instructions to control block 38.

In operation, electrode set 20, 22 and 24 is moved relative to the array of solar cells by either stepping the solar cell array under the set of electrodes or by moving the set of electrodes along the array. As illustrated in FIG. 1, each conductive strip 16 defines an aperture 18 along one edge thereof. The aperture size is much smaller on the surface of the solar cell, and the apertures are located so that at least one aperture 18 overlies each metallization 14 of solar cell 10. Welded regions 19a and 19b as illustrated in FIG. 1 connect a strip 16 to upper metallization contact 14a and 14b of solar cells 10a and 10b, respectively. In the relative positions illustrated in FIG. 1, electrode set 20, 22 and 24 is located above solar cell 10c, in readiness for commencement of a welding operation in accordance with the invention.

As described in the aforementioned copending patent application, a current which is well below the welding current is passed through welding electrodes 20 and 22 during a first step of the prewelding procedure, and the voltage thereacross is measured, thereby providing an indication of the contact resistance between the electrodes 20, 22 and strip 16c. If the resistance is low, a further measurement of resistance is made between at least one of electrodes 20 and 22 and electrode 24. Since it is already known from the first measurement that the contact resistance between electrodes 20, 22 and strip 16c is low, a high resistance reading would be an indication that the interface between strip 16c and metallization 14c was dirty or corroded, and that cleaning was required. If cleaning is not required, or if retesting after cleaning indicates that the contact resistances are all low, the actual welding procedure can begin.

In accordance with an aspect of the invention, controllable current source 36 is capable of providing energy at a rate which is high enough to raise the temperature of the region to be welded at a rate greater than a predetermined value. In accordance with another aspect of the invention, when a predetermined temperature is reached, the controllable current source is controlled in a feedback manner by monitoring the temperature of the region being welded to maintain the temperature constant at a predetermined value for a predetermined length of time. In accordance with a yet further aspect of the invention, the temperature of the region just welded is dropped at a rate which exceeds a predetermined rate.

Figure 2:
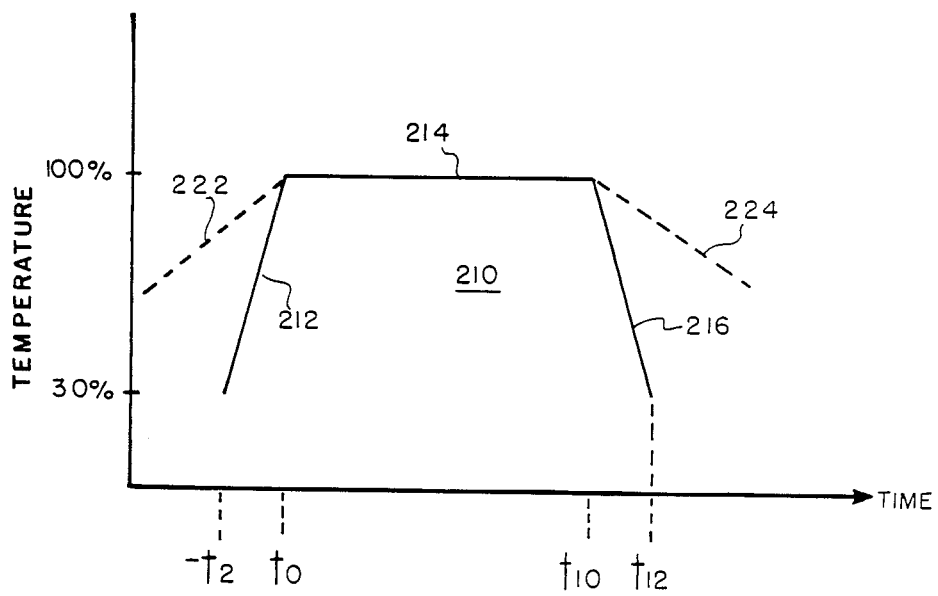
FIG. 2 is a temperature-time diagram illustrating various welding profiles.

FIG. 2 illustrates in solid lines a welding profile 210 in accordance with the invention. Welding profile 210 includes a portion 212, extending from a time −t2 to a time t0, in which the temperature of the region being welded is raised toward the final welding temperature. In FIG. 2, the final welding temperature is illustrated as 100%. Once the temperature of the region to be welded has reached 100%, as a time t0, the temperature rise is stopped and the rate of application of energy is controlled to hold the temperature constant for a predetermined time, illustrated in FIG. 2 as time t0-t10, where the hyphen represents the word "to". Following time t10, the temperature of the weld is allowed or caused to decrease along a temperature-time path 216, which has a slope greater than a predetermined minimum slope. The decrease in temperature as illustrated in FIG. 2 takes place over the time interval t10-t12.

It can be shown that redistribution of atoms during time interval −t2-t0 or t10-t12 occurs according to the following expression:

$$X = (\overline{6Dt})^{\frac{1}{2}} = \frac{D_0 T^2 k}{\alpha Q} \exp\left(-\frac{Q}{kT}\right) \quad (5)$$

where $\alpha$ is the rate of increase of temperature (i.e., slope of profile 212). Thus, the distance that an atom moves from the original position in inversely proportional to the rate of rise of temperature (i.e., a tenfold increase in $\alpha$ will lead to a tenfold reduction in X).

The significance of the profile illustrated in FIG. 2 can be understood by considering that, if a temperature profile other than the flat profile 214 were to be used, there would be times in the interval t0-t10 during which the temperature exceeded the temperature illustrated as 100%. During this time, the rate of nucleation of undesired phases and the rate of growth of such phases would increase dramatically. Furthermore, the rate of diffusion of the atoms in the region to be welded would increase dramatically. Consequently, the size of the fusion or weld region would be less well defined, and the characteristics of the unwanted phases would be accentuated.

If, instead of the relatively high rate of increase of temperature illustrated by 212 of FIG. 2, the rate of rise of temperature were at a lesser rate, as for example that given by line 222 of FIG. 2, the weld would be further degraded. This is because the diffusion of atoms is normally considered to be significant at temperatures above about 30% of the fusion temperature (temperature measured in degrees Celsius). So long as the temperature is maintained below 30% as illustrated in FIG. 2, the characteristics of the weld region are therefore unaffected. However, if the controllable current source cannot supply energy at a high enough rate to raise the temperature of the work piece quickly, the dwell time at temperatures above 30% of the fusion temperature may be protracted. In fact, if the rate of heat loss from a large work piece were approximately equal to the rate of energy application, the temperature might approach fusion temperature but never quite reach it, resulting in generation of very large amounts of unwanted phases and an extremely poor or nonexistent weld. Thus, it is desirable that the approach to welding temperature be accomplished as quickly as possible. While the factors entering into the diffusion, nucleation and growth of phases is very complex, it has been found that a satisfactory rate of rise of temperature is about 70% of temperature (100%-30% in FIG. 2) taking place in a time equal to about 20% of the time during which the constant high temperature is maintained. Thus, in FIG. 2, a constant temperature is maintained in the interval t0-t10, as illustrated by profile 214, and profile 212 rises from a temperature of 30% to a temperature of 100% in about 1/5 of time t0-t10, namely time −t2 to t0.

Similarly, the considerations which suggest that the time rate of increase of temperature at the initiation of welding should be high also suggests that a rapid drop in temperature is desirable after the welding is completed.

In accordance with another aspect of the invention, the time rate of decrease of the temperature of the work piece after welding is completed is 70% of the temperature in 20% of the time dwell at full temperature. In the case of a large workpiece, which is raised to a high temperature but has a relatively large volume compared with its surface area, the temperature profile might be similar to profile 224 of FIG. 2 even if the welding power is turned completely off after time t10. This can be corrected by actively removing heat, as by quenching. In the arrangement of FIG. 1, a gas source illustrated as a block 50 is connected to a pipe illustrated as 52, which blows a stream of argon onto the region being welded. This has two advantages. The argon displaces air in the vicinity of the weld and, being inert, prevents oxidation of the metals being welded. Furthermore, the stream of argon gas is cold and tends to carry away heat, so that the temperature of the welded region decreases quickly, as illustrated by profile portion 216 of FIG. 2, after weld power is removed. For small work pieces such as that illustrated in FIG. 1, the thermal conductivity of the work piece itself, together with its relatively large surface area compared with volume, tends to reduce the temperature very quickly and, together with the stream of argon, provides satisfactory temperature decrease.

Figure 3:
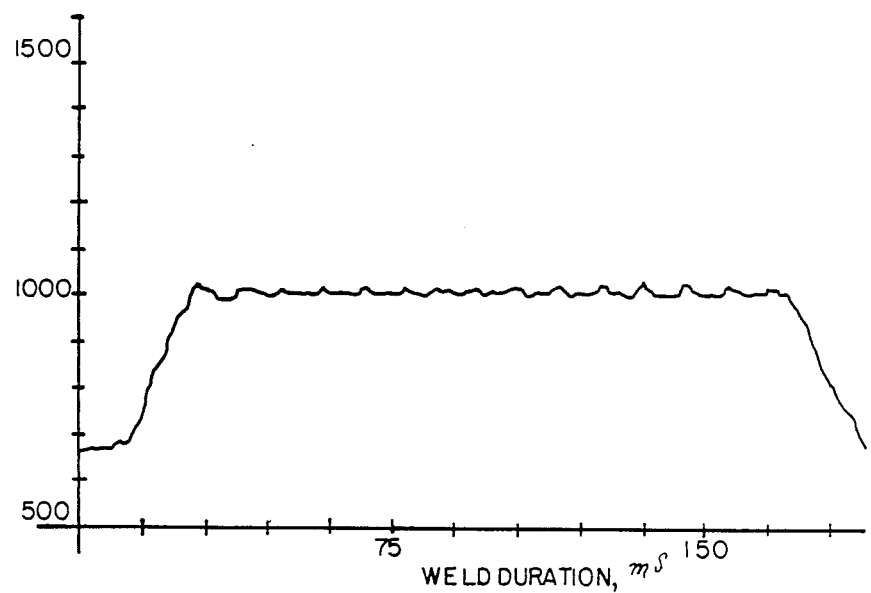
FIGS. 3a and 3b are typical weld profiles in accordance with the invention.
Figure 4:
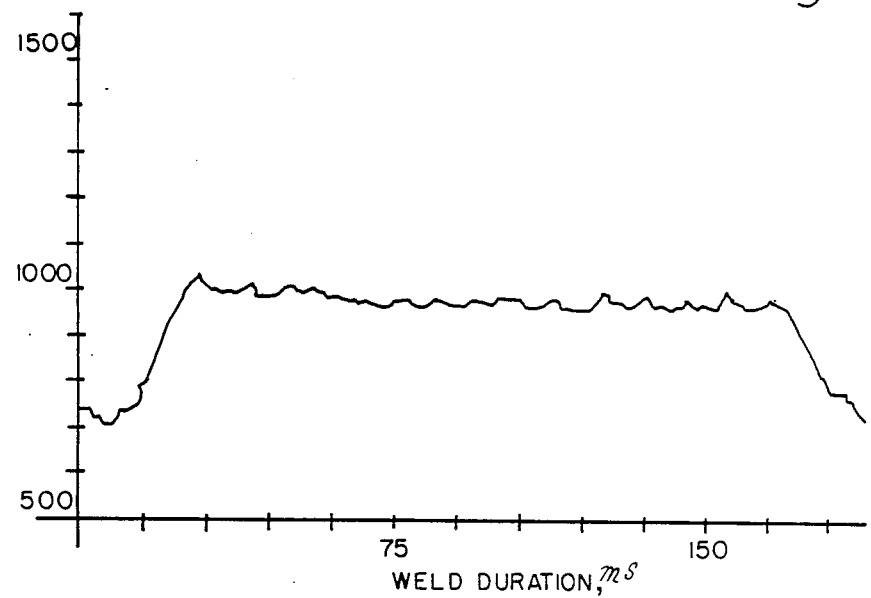

FIGS. 3 and 4 illustrate plots of temperature-time welds in accordance with the invention, produced by the apparatus of FIG. 1. In FIGS. 3 and 4, the plots appear to indicate a starting temperature in the region of 600° C. This portion of the plot represents an anomaly attributable to the characteristics of infrared temperature monitor 44 of FIG. 1. In short, monitor 44 has a "floor" or is insensitive below about 600°. Consequently, the only meaningful temperatures are those above 600°. It should be noted, however, that the actual temperature of the work piece rises from room temperature in the manner shown in FIG. 2. Naturally, if monitoring is desired at lower temperatures, an array of sensors could be used, as in the aforementioned Dostoomian patent. The rate of rise indicated in FIG. 3 is about $(1025-673)/(28-10.5) = 20.4°$ C./msec. The deviations from constant temperature in the time interval from about 30 to 160 mS are attributable to the sampling rate of the sensor and to the nonlinearity of the voltage-current characteristic of the weld region and of the electrode contacts.

In operation, keypad 48 is used to enter the desired constant weld temperature, and switch 40, which may be a foot pedal, is closed to begin the welding procedure. The control block 38 then operates switch 30 and controllable current source 36 in order to make the aforementioned resistance measurements to verify the cleanliness of the interface between the pieces being joined, and indicates by lamps 41 and 43 the need for cleaning of various portions of the apparatus. When the resistances are within limits, it thereafter initiates the actual weld by applying maximum power for applying energy at the highest possible rate by way of electrodes 20 and 22 to the region being welded. While the temperature is rising (corresponding to region 212 of FIG. 2), temperature monitor 44 indicates a temperature below the desired temperature set point. When the desired set point temperature is reached, control block 38 reduces the power in a feedback manner so as to maintain the set point for the desired duration. At the end of the desired time, corresponding to time T10 of FIG. 2, the power is ordinarily turned off to allow cooling of the work piece. If active quenching is desired, controller 38 may increase the flow of fluid when power is reduced, as by means of conductor 54 of FIG. 1.

Other embodiments of the invention will be apparent to those skilled in the art. If desired, the work piece can be immersed in a liquid such as liquid nitrogen during the welding procedure so that, when the power is removed, the temperature will drop more quickly. Analog or digital control may be provided.

We claim:

1. A method for welding two fusible pieces comprising the steps of:
   juxtaposing said two pieces near the region to be welded;
   monitoring at least one temperature near said region to be welded;
   applying energy to said two pieces near said region to be welded to raise the temperature of said two materials near said region at a temperature-time rate which has a value greater than 70% of said predetermined temperature divided by 20% of a predetermined time; and
   when said applying energy step causes said temperature to reach a predetermined temperature, using the results of said monitoring step for controlling said applying of energy in order to maintain said predetermined temperature for said predetermined time.

2. A method according to claim 1 wherein said two materials are silver, said predetermined temperature is about 1025° C., said predetermined time is about 150 mS, and said temperature-time rate is about 350° C. in 15 msec.

3. A method according to claim 1 wherein said two pieces are of dissimilar materials.

4. An apparatus for welding together two juxtaposed fusible pieces, comprising:
   temperature monitoring means for monitoring the temperature in at least a portion of the region in which said pieces are juxtaposed;
   controllable means for applying electrical energy to said region of said pieces at a rate sufficient to raise the temperature of said juxtaposed region at a time rate greater than 70% of a predetermined temperature in 20% of a predetermined time interval; and
   control means coupled to said temperature monitoring means and to said controllable means for limiting said application of electrical energy to said region for maintaining said region at a substantially constant temperature for said predetermined time interval, said substantially constant temperature being about equal to said predetermined temperature.

5. An apparatus according to claim 4 further comprising means for quenching said region for reducing said temperature after the end of said predetermined time interval.

6. An apparatus according to claim 5 wherein said means for quenching comprises means for causing a fluid to come into contact with said region.

7. An apparatus according to claim 6 wherein said means for quenching comprises means for directing a stream of fluid to waid said region.

8. An apparatus according to claim 7 wherein said means for quenching further comprises means for controlling the flow of said stream of fluid.

9. An apparatus according to claim 8 wherein said means for quenching comprises means for controlling the time rate of said flow of said stream of fluid.

10. An apparatus for welding together two juxtaposed fusible pieces, comprising:
    temperature monitoring means for monitoring the temperature in at least a portion of the region in which said pieces are juxtaposed;
    controllable means for applying electrical energy to said region of said pieces at a rate sufficient to raise the temperature of said juxtaposed region at a time rate greater than 70% of a predetermined temperature in 20% of a predetermined time inverval;
    control means coupled to said temperature monitoring means and to said controllable means for limiting said application of electrical energy to said region for maintaining said region at a substantially constant temperature for said predetermined time interval, said substantially constant temperature being about equal to said predetermined temperature; and
    means for quenching said region for reducing said temperature after the end of said predetermined time interval by causing a stream of fluid to come into contact with said region; and
    means coupled to said steam of fluid for controlling the time rate of flow of said fluid, said means for controlling the time rate of flow further comprising means for augmenting said flow beginning at the end of said predetermined time interval.

* * * * *